(12) United States Patent
Amiri et al.

(10) Patent No.: US 12,542,725 B2
(45) Date of Patent: Feb. 3, 2026

(54) TRAFFIC MATRIX ESTIMATION WITH THE QSP-MLE MODEL AND RECURSIVE IMPROVEMENT

(71) Applicant: Ciena Corporation, Hanover, MD (US)

(72) Inventors: Maryam Amiri, Ottawa (CA); John Wade Cherrington, Salt Spring Island (CA); Petar Djukic, Ottawa (CA)

(73) Assignee: Ciena Corporation, Hanover, MD (US)

( * ) Notice: Subject to any disclaimer, the term of this patent is extended or adjusted under 35 U.S.C. 154(b) by 830 days.

(21) Appl. No.: 17/579,687

(22) Filed: Jan. 20, 2022

(65) Prior Publication Data

US 2023/0231783 A1 Jul. 20, 2023

(51) Int. Cl.
| | |
|---|---|
| *H04L 43/026* | (2022.01) |
| *H04L 41/142* | (2022.01) |
| *H04L 43/062* | (2022.01) |
| *H04L 43/08* | (2022.01) |
| *H04L 43/0876* | (2022.01) |

(52) U.S. Cl.
CPC ........ *H04L 43/062* (2013.01); *H04L 43/0876* (2013.01)

(58) Field of Classification Search
CPC . H04L 43/062; H04L 43/0876; H04L 43/026; H04L 43/08; H04L 41/142
USPC .......................................................... 372/252
See application file for complete search history.

(56) References Cited

U.S. PATENT DOCUMENTS

| | | | |
|---|---|---|---|
| 8,477,679 B2 | 7/2013 | Sharifian et al. | |
| 8,887,217 B2 | 11/2014 | Salem et al. | |
| 9,060,292 B2 | 6/2015 | Callard et al. | |
| 9,432,257 B2 | 8/2016 | Li et al. | |
| 9,686,816 B2 | 6/2017 | Sun et al. | |
| 9,819,565 B2 | 11/2017 | Djukic et al. | |
| 9,832,122 B2 * | 11/2017 | Dharmapurikar | ... H04L 45/7453 |
| 9,832,681 B2 | 11/2017 | Callard et al. | |
| 9,871,582 B2 | 1/2018 | Djukic et al. | |
| 9,979,624 B1 * | 5/2018 | Volpe | ...................... H04L 43/16 |
| 9,980,284 B2 | 5/2018 | Djukic et al. | |
| 10,015,057 B2 | 7/2018 | Djukic et al. | |

(Continued)

OTHER PUBLICATIONS

Mehrtash et al., IEEE Journal "Decision Directed Channel Estimation Based on Deep Neural Network k-Step Predictor for MIMO Communications in 5G", Published: Nov. 2019 (Year: 2019).*

(Continued)

*Primary Examiner* — Christopher M Crutchfield
*Assistant Examiner* — Syed Ahmed
(74) *Attorney, Agent, or Firm* — Baratta Law PLLC; Lawrence A. Baratta, Jr.

(57) ABSTRACT

Systems and methods include receiving network data from a network; estimating large flows from the network data utilizing a first statistical approach; responsive to the network being large flow dominant, recursively estimating flows in the network utilizing the first statistical approach until an exit condition is reached; and combining the recursively estimated flows and forming a traffic matrix based thereon. The recursively estimating flows can include estimating a set of large flows utilizing the first statistical approach and freezing a resulting estimate while leaving smaller flows unsolved; repeating the estimating for a next set of large flows from the unsolved smaller flows; and continuing the repeating until the exit condition is reached.

18 Claims, 10 Drawing Sheets

(56) References Cited

U.S. PATENT DOCUMENTS

| | | | |
|---|---|---|---|
| 10,069,570 | B2 | 9/2018 | Djukic et al. |
| 10,148,578 | B2 | 12/2018 | Morris et al. |
| 10,153,869 | B2 | 12/2018 | Djukic et al. |
| 10,390,348 | B2 | 8/2019 | Zhang et al. |
| 10,448,425 | B2 | 10/2019 | Au et al. |
| 10,491,501 | B2 | 11/2019 | Armolavicius et al. |
| 10,536,360 | B1 * | 1/2020 | Whiteside ............. H04L 47/125 |
| 10,623,277 | B2 | 4/2020 | Djukic et al. |
| 10,631,179 | B2 | 4/2020 | Djukic et al. |
| 10,644,941 | B2 | 5/2020 | Djukic et al. |
| 10,746,602 | B2 | 8/2020 | Pei et al. |
| 10,887,899 | B2 | 1/2021 | Au |
| 10,945,243 | B2 | 3/2021 | Kar et al. |
| 11,153,196 | B2 * | 10/2021 | Sanchez Charles .... H04L 45/08 |
| 11,323,340 | B2 * | 5/2022 | Hira ...................... H04L 43/026 |
| 11,489,780 | B1 * | 11/2022 | Khosravi ............. H04L 47/762 |
| 2014/0229210 | A1 | 8/2014 | Sharifian et al. |
| 2015/0071072 | A1 * | 3/2015 | Ratzin ..................... G06F 9/544 370/235 |
| 2016/0226774 | A1 * | 8/2016 | Farmanbar ............. H04L 47/24 |
| 2018/0062943 | A1 | 3/2018 | Djukic et al. |
| 2019/0230046 | A1 | 7/2019 | Djukic et al. |
| 2019/0379589 | A1 | 12/2019 | Ryan et al. |
| 2020/0067935 | A1 | 2/2020 | Carnes, III et al. |
| 2020/0313380 | A1 | 10/2020 | Pei et al. |
| 2020/0351380 | A1 | 11/2020 | Fedorov et al. |
| 2020/0387797 | A1 | 12/2020 | Ryan et al. |
| 2021/0028973 | A1 | 1/2021 | Cote et al. |
| 2021/0076111 | A1 | 3/2021 | Shew et al. |
| 2021/0150305 | A1 | 5/2021 | Amiri et al. |

OTHER PUBLICATIONS

Adelani et al., IEEE Communication, Title: "Hybrid Techniques for Large-Scale IP Traffic Matrix Estimation", Published: 2010; (Year: 2010).*

Iraj et al., Title: "From statistical—to machine learning-based network traffic prediction", © 2021 The Authors. Transactions on Emerging Telecommunications Technologies published by John Wiley & Sons Ltd. (Year: 2021).*

U.S. Appl. No. 16/854,738, filed Oct. 19, 2019, Sanchez et. al.*

Mehrtash et al., IEEE Journal "Decision Directed Channel Estimation Based on Deep Neural Network k-Step Predictor for MIMO Communications in 5G", Published: Nov. 2019 (Year: 2019) (Year: 2019).*

Adelani et al., IEEE Communication, Title: "Hybrid Techniques for Large-Scale IP Traffic Matrix Estimation", Published: 2010; (Year: 2010) (Year: 2010).*

Iraj et al., Title: "From statistical—to machine learning-based network traffic prediction", © 2021 The Authors. Transactions on Emerging Telecommunications Technologies published by John Wiley & Sons Ltd. (Year: 2021) (Year: 2021).*

Jain, Sushant, et al. "B4: Experience with a globally-deployed software defined WAN." ACM SIGCOMM Computer Communication Review 43.4 (2013): 3-14. (Year: 2013).*

Liu, Guiyan, et al. "Tomogravity space based traffic matrix estimation in data center networks." Future Generation Computer Systems 86 (2018): 39-50. (Year: 2018).*

Queiroz, Wander J., Miriam AM Capretz, and Mario AR Dantas. "A MapReduce Approach for Traffic Matrix Estimation in SDN." IEEE Access 8 (2020): 149065-149076. (Year: 2020).*

Teixeira et al., "Advanced Fiber-Optic Acoustic Sensors," Photonic Sensors / vol. 4, No. 3, 2014, pp. 198-208.

Phaal et al., "InMon Corporation's sFlow: A Method for Monitoring Traffic in Switched and Routed Networks," Network Working Group, Category: Informational, The Internet Society, Sep. 2001, pp. 1-31.

Quittek et al., "Requirements for IP Flow Information Export (IPFIX)," Network Working Group, Category: Informational, The Internet Society, Oct. 2004, pp. 1-33.

B. Claise, "Cisco Systems NetFlow Services Export Version 9," Network Working Group, Category: Informational, The Internet Society, Oct. 2004, pp. 1-33.

Claise et al., "Specification of the IP Flow Information Export (IPFIX) Protocol for the Exchange of Flow Information," Internet Engineering Task Force (IETF), Obsoletes: 5101, Category: Standards Track, ISSN: 2070-1721, Sep. 2013, pp. 1-76.

Zhang et al., "Fast Accurate Computation of Large-Scale IP Traffic Matrices from Link Loads," ACM 1581136641/03/0006, 2003, pp. 1-12.

Medina et al., "Traffic Matrix Estimation: Existing Techniques and New Directions," ResearhGate, ACM 158113570X/02/0008, 2002, pp. 1-15.

* cited by examiner

*FIG. 5*
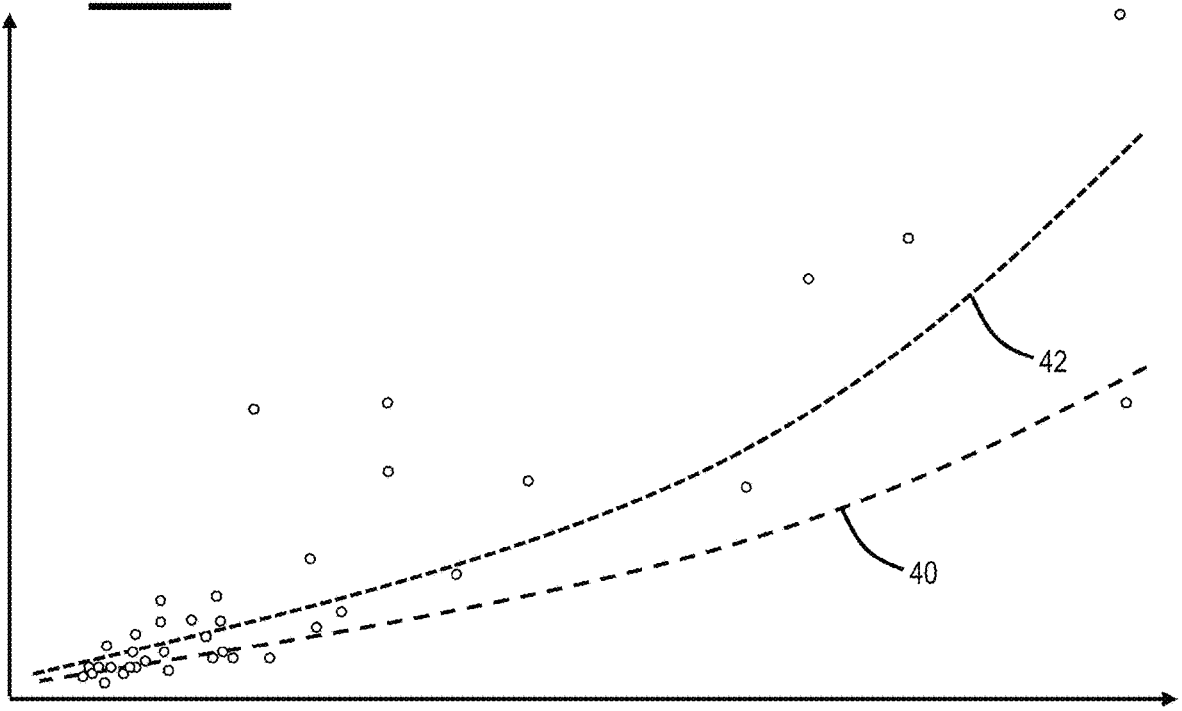
FD = MAX FLOW / UNIFORM DIVISION OF TOTAL FLOW
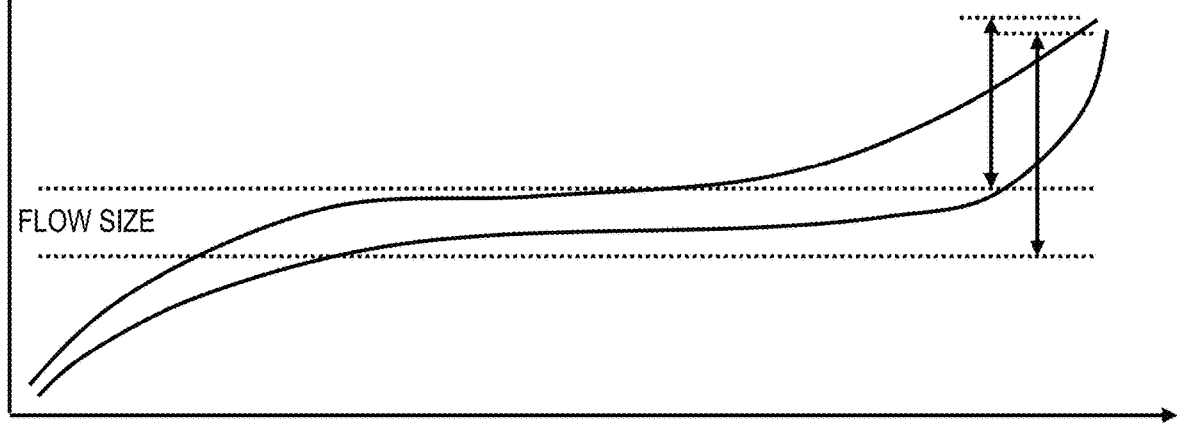
FLOW SIZE
SORTED FLOW INDEX
*FIG. 6*

TRAFFIC MATRIX ESTIMATION WITH THE QSP-MLE MODEL AND RECURSIVE IMPROVEMENT

CROSS-REFERENCE TO RELATED APPLICATION(S)

The present disclosure relates to U.S. patent application Ser. No. 17/373,934, filed Jul. 13, 2021, and entitled "Estimating the traffic matrix of a communication network using network topology features," the contents of which are incorporated herein in their entirety, and referred to herein as the tomocentrality model.

FIELD OF THE DISCLOSURE

The present disclosure generally relates to networking. More particularly, the present disclosure relates to systems and methods for estimating a traffic matrix of a communication network using the quasi-stationary peaking maximum-likelihood estimation (QSP-MLE) model and recursive improvement.

BACKGROUND OF THE DISCLOSURE

An Origin-Destination (OD) (or Source-Destination) traffic matrix describes the amount of traffic between each OD pair in the network and is a major input to the design, planning, and management of a telecommunications network. The traffic matrix is difficult to measure directly on large commercial backbones. Tunnel packet counters and NetFlow/IPFIX, which sample packets transiting through a given router and infer their origin and destination from packet headers, are the currently used approaches for measurement, but have several drawbacks: (1) they require deploying the same software on all core routers which may not be feasible due to cost and heterogeneity of networking equipment, (2) they generate a significant processor demand on the routers which negatively impacts the router overall performance, and (3) synchronizing individual measures and storing measurement data is complex.

Examples of direct measurement include NetFlow/IPFIX. NetFlow is described in RFC 3954, "Cisco Systems NetFlow Services Export Version 9," October 2004, and RFC 3176, "InMon Corporation's sFlow: A Method for Monitoring Traffic in Switched and Routed Networks," September 2001, the contents of both are incorporated by reference. IPFIX is described in RFC 7011, "Specification of the IP Flow Information Export (IPFIX) Protocol for the Exchange of Flow Information," September 2013, the contents of which are incorporated by reference. However, due to the aforementioned limitations, direct measurement is not supported extensively.

It is possible to estimate the traffic matrix instead of using the measurement approach which starts with assumptions that periodic snapshots of the direct link utilization (e.g., total bytes flowing directly from one router to another) are available, and, for each origin-destination pair, the route taken across the network is known. However, traffic matrix estimation is an underdetermined problem. To see how this data leaves an undetermined problem, we take an example of a network with N=11 nodes and 15 bidirectional links, as illustrated in FIG. 1. Such a network would have $11^2=121$ directed flows, however only 2×15=30 directed link utilization measurements are available. The route knowledge allows us to assert that sum of flows along directed link is equal to the total measured at that direct link, but, in this example, this means there 30 linear equations with 121 unknowns, hence the underdetermination. In practice this is the generic situation: there are many possible flow assignments that satisfy the link summation conditions, some of which will yield potentially highly inaccurate flow values. The goal of traffic matrix estimation is therefore to introduce additional relationships that are known to be approximately true, and when combined with the constraining relations we do have yield as accurate as possible flow estimations.

In surveying the field of traffic matrix estimation broadly, there are two types of approaches that have attracted the most research interest and in producing the best reported results, namely heuristic approaches and statistical approaches. In heuristic approaches, some form of the traffic matrix with fewer unknowns is taken as a first approximation, followed by a projection of the first approximation onto the summation constraints. The best-known exemplars of this approach in the open literature are known as gravity, tomogravity, and generalized gravity. In this category, the inventors have proposed a version in the tomocentrality model.

Statistical approaches center on the maximum-likelihood estimation (MLE); they assume particular parametric form for the unknown flows (i.e., Gaussian with mean and variance to be solved for). The key idea is that if a relation relating mean and variance is assumed, a sufficient number of observations will allow the maximum-likelihood estimation to converge. An early form of this model (due to Vardi) required mean to be proportional to variance, whereas the more later work of Cao in which mean is related to variance through a power law is the starting point for our own work.

Statistical approaches offered some of the best reported results. In implementing, trialing, and experimenting the leading statistical approaches we identified three key weaknesses:

1. Distributions from real network flow data were approximately Gaussian however often had heavy tails and in particular outliers.

2. The mean-variance relation held in loose sense only; large flow outliers in particular were hard to fit a singular consistent mean-variance power law too.

3. To form a time-varying traffic matrix through-out the day, an hours' worth of 5-minute data lead to 12 samples before having to reach more than an hour back.

More generally, among all approaches including both heuristic and statistic, there was a broad pattern hereby the greatest contribution to the average error would typically come from the smaller flows.

BRIEF SUMMARY OF THE DISCLOSURE

The present disclosure describes (a) a novel model quasi-stationary peaking maximum-likelihood estimation (QSP-MLE) within the general statistical MLE family of traffic matrix estimation (TME) models and (b) a generic strategy (recursive improvement) that can be used either with (a) or with other TME models. These concepts may be applied to the TME problem i) stand-alone using ideas describe in the present disclosure only, in combination with the tomocentrality model, and/or iii) in combination with (or as an enhancement strategy in the case of recursive improvement) with other traffic matrix techniques.

In various embodiments, the present disclosure includes a method with steps, an apparatus including a processor configured to implement the steps, and a non-transitory computer-readable medium with instructions that, when executed, cause a processing device to perform the steps.

The steps include receiving network data from a network; estimating large flows from the network data utilizing a first statistical approach; responsive to the network being large flow dominant, recursively estimating flows in the network utilizing the first statistical approach until an exit condition is reached; and combining the recursively estimated flows and forming a traffic matrix based thereon.

The steps can further include, responsive to the network not being large flow dominant, estimating the flows utilizing a second statistical approach and forming the traffic matrix based thereon. The first statistical approach can include quasi-stationary peaking maximum-likelihood estimation and the second statistical approach is tomocentrality. The steps can further include utilizing the traffic matrix for traffic engineering in the network. The first statistical approach can include quasi-stationary peaking maximum-likelihood estimation.

The recursively estimating flows can include estimating a set of large flows utilizing the first statistical approach and freezing a resulting estimate while leaving smaller flows unsolved; repeating the estimating for a next set of large flows from the unsolved smaller flows; and continuing the repeating until the exit condition is reached. The exit condition can be a number of large flows below a threshold. The combining can include a weighted average.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 5 is a graph of alternative mean-variance fittings to largest traffic flows.

FIG. 6 is a graph illustrating the concept of flow dominance.

DETAILED DESCRIPTION OF THE DISCLOSURE

Again, the present disclosure describes (a) a novel model quasi-stationary peaking maximum-likelihood estimation (QSP-MLE) within the general statistical MLE family of traffic matrix estimation (TME) models and (b) a generic strategy (recursive improvement) that can be used either with (a) or with other TME models. These concepts may be applied to the TME problem i) stand-alone using ideas describe in the present disclosure only, in combination with the tomocentrality model, and/or iii) in combination with (or as an enhancement strategy in the case of recursive improvement) with other traffic matrix techniques.

The QSP-MLE model draws on the underlying philosophy of maximum likelihood estimation (MLE) for traffic matrix problem pioneered by the work of Vardi and Cao. However, it makes fundamentally departures, both in aiming to estimate a redefined form of the traffic matrix as well as in details of carrying out the estimation process. The overcoming of past shortcomings plays out in three stages. First, the specific three failings of the statistical (MLE) approach described in § 1 were mitigated by the design of QSP; the QSP design and how it addresses these issues specifically are also described in § 1. The second stage of improvement came by noticing that, fortuitously, the largest flows across tested networks tended to be better than average estimated compared to the smallest, and in fact the error in small, minor flows strongly skewed overall performance (despite being isolated outliers associated to often negligibly small flows). This lead us to the concept of recursive improvement described in § 2. The third and final stage of improvement comes from an ensemble model concept described in § 3, whereby large-flow dominated networks (and importantly their recursions) are estimated by QSP-MLE, and networks that are not large-flow dominant use the previously disclosed tomocentrality model which is particularly strong in that case. Taken together, the results reported in § 4 represent a new level of traffic matrix estimation performance not previously reported.

§ 1.0 QSP-MLE MODEL

In this section we define what we call the quasi-stationary peaking (QSP) model. The first step of this approach is to define QSP periods versus non-QSP periods. Our modelling assumption is as follows:

(1) The relative shape of the flow matrix during comparable days is the same up to small fluctuation that scales the matrix by an overall factor over the peaking period, and between comparable days. A peaking period is defined as the period in which the flow is in a large percentile: typically, this would be 95% but in practice we use 85% to gather more samples.

(2) Outside periods of bursty anomalies, the flow distribution during peaking period follows a Gaussian distribution.

Figure 1:
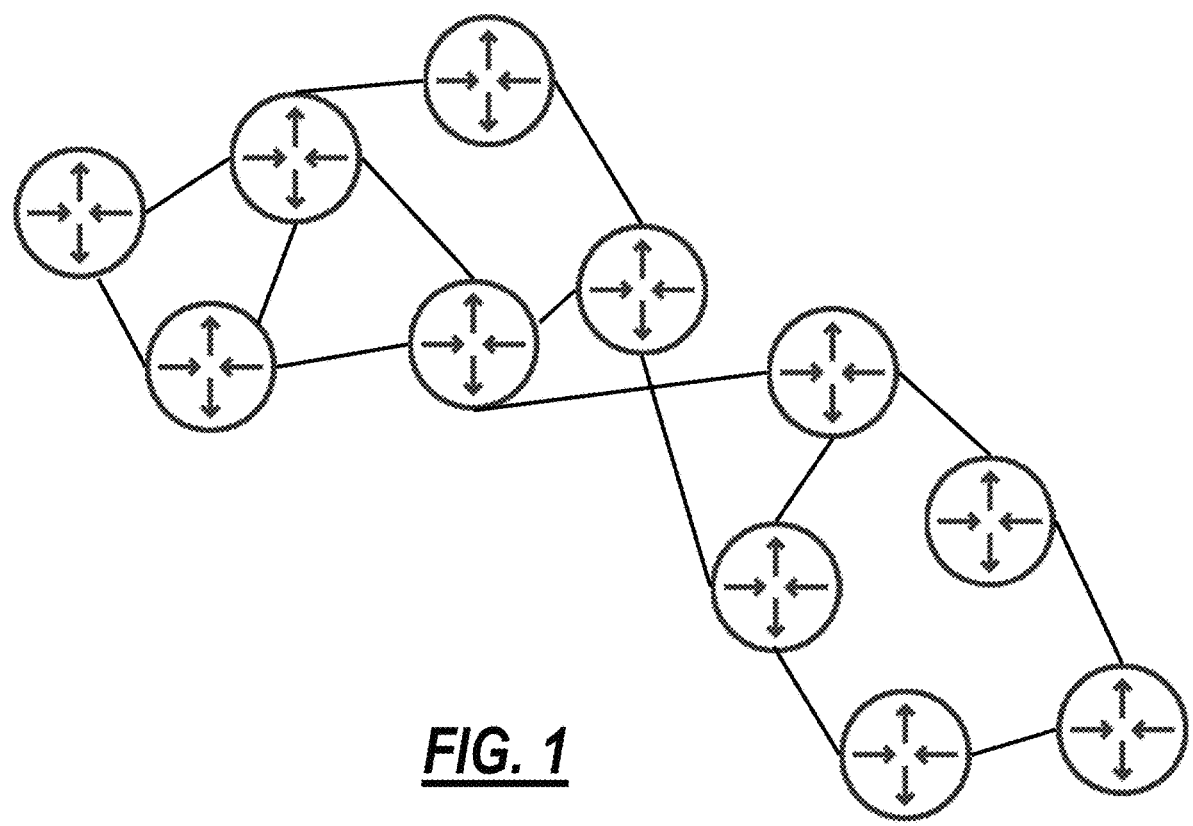
FIG. 1 is a network diagram of an example network with N=11 nodes and 15 bidirectional links.
Figure 2:
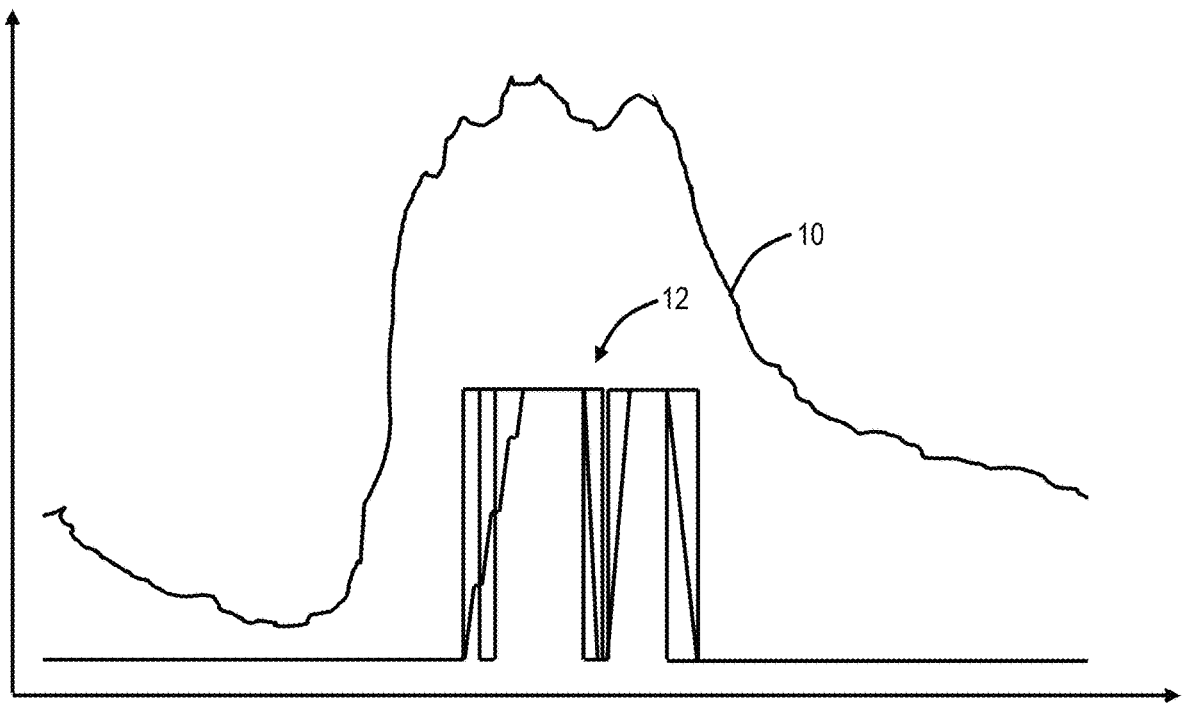
FIG. 2 are two graphs of link utilization, each being a single day's worth of normalized data (288 samples at 5-minute intervals.
Figure 2:
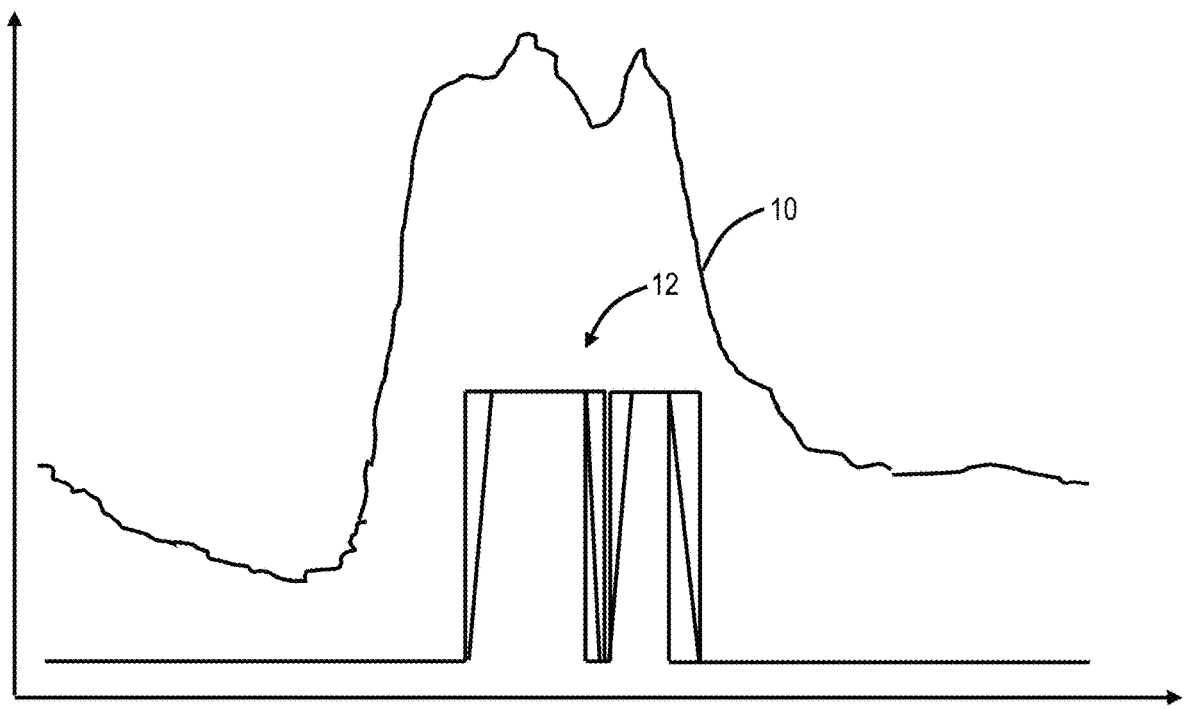

It will help to understand the above by way of some example plots, as illustrated in FIG. 2. A line 10 is the total of all link utilizations. Box functions 12 are 1 on 85% peaking part of day, and 0 otherwise (a smoothing of the sampling functions also appear as sloping lines). We find in practice that for non-holiday business days, there is essentially a very high correlation between any two days as per FIG. 2. We also draw attention to the empirical feature that the peak traffic part of the day forms a roughly flat "shelf" (with some fluctuation). It is these observations that motivate the modelling assumption (1).

Figure 3:
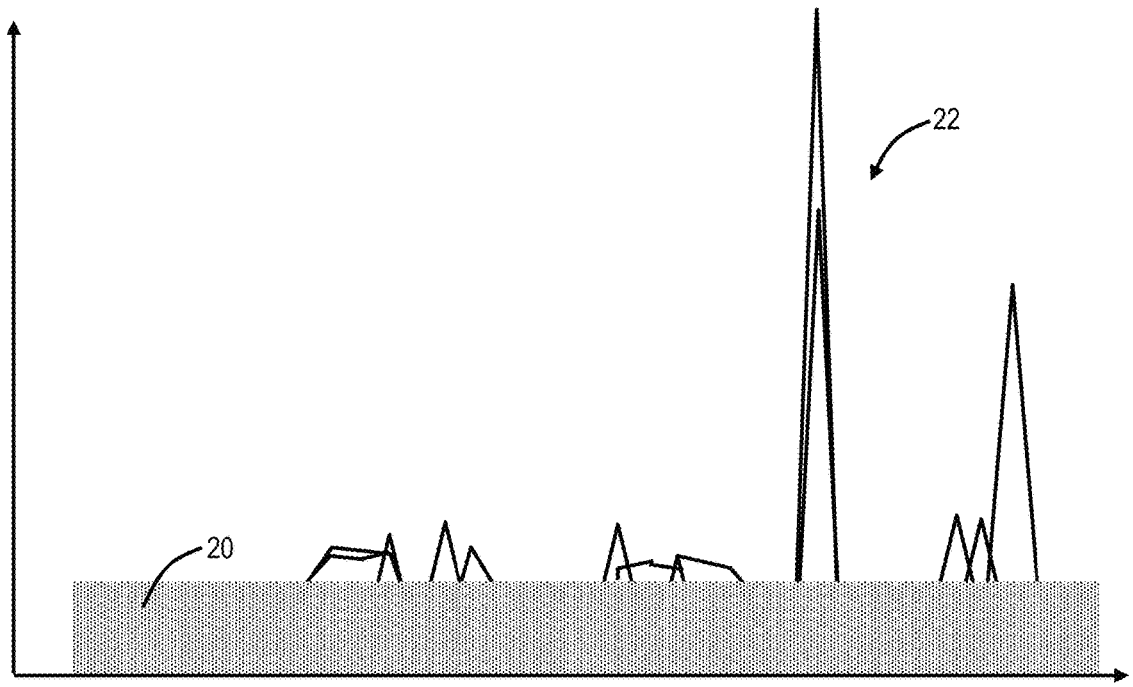
FIG. 3 is a graph of link utilization illustrating link anomalies occurring during peaking period.

To illustrate point (2) above with regard to bursty anomalies we refer the reader to FIG. 3, in which appears another example of a single days data, but restricted to the peaking period (leading to approximately 45/288 samples) as would be defined by the 85% masking function illustrated in FIG. 2. Values 20 are individual link, normalized to their daily average. During most of the samples, all links move close to normalized value of 1. However, there is a clearly a distinctive subset of samples 22 where some of links suddenly far exceed their daily average. The values 20 are a binary-valued sample masking function; where 0 the samples are dropped and where 1 the samples are included. We use this signal to drop these sample times from our model input, as generically we would expect at least one or more flows associated to said links exhibit an anomaly (i.e., outlier) relative to its assumed Gaussian form.

Figure 4:
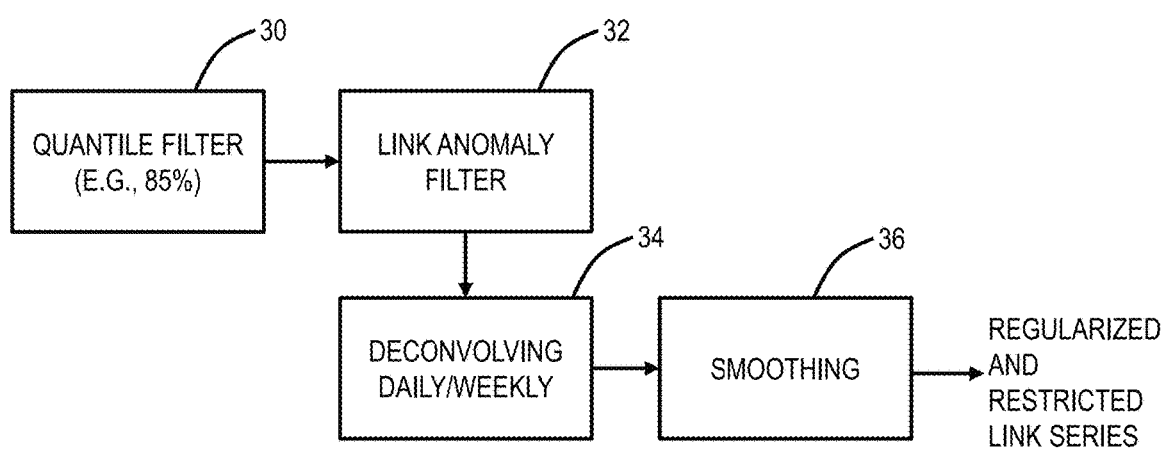
FIG. 4 is a block diagram of QSP which is essentially a filtering of the original set of measurements through various stages.

Summarizing, the QSP is essentially a filtering of the original set of measurements through the following stages in FIG. 4. Blocks 30, 32 are the core of the QSP filter; the second blocks 34, 36 are less critical to the idea but have some marginal benefit. Deconvolving accounts for small intraday and interday variations (based on observable total link traffic) and smoothing can add some additional improvement to narrowing variance and outlier.

The concept of QSP-MLE is then to apply MLE methods not to the original link series of samples, but to the link series of samples that results from applying the above blocks 30-36. In terms of problems identified with standard form of MLE listed above, this turns out to improve the situation as follows:

1) Gaussianity: restricted to QSP period, the flow is more significantly more Gaussian; in particular the resulting distributions are less prone to skewing towards long/fat tails and outliers.

2) Mean-variance: the dispersion of mean-variance is improved somewhat. Additional addressing of this issue will be discussed when QSP-MLE is performed with recursive improvement (§ 3).

3) Batch-size: because a quasi-stationary (on scale of days and week) sub-process has been singled out, many more samples can be used to estimate than on hour-to-hour basis.

The main application of this technique applies to the relatively flat peaking part of day as illustrated in figures above; it is this period that is critical for traffic engineering as it is where peak congestion effects are felt on the network. While this means the QSP by itself as described will be directly useful, there are a few variations that could be taken to apply it to non-peak part of day as well as variation within peaking period.

The technique could be applied to other flat periods (including quiet parts of day) by having the quantile filter on some much smaller quantile, e.g., 15-25%. While not explored yet in research, if quiet and peak flat regions were individually modeled its possible some interpolation be applied to the transitional periods, which occur at highly regular times from day to day. One application of modelling quiet periods may be to enable offering of special time-scheduled services such as middle-of-night data transfer between data centers.

For slower frequency variations that occur during peak period, the deconvolution that occurs in the third stage can be restored to a faster time scale by using total link average to rescale the regularized QSP estimate. We call this "back-fitting" and could also be combined with a model that specifically targets the link anomaly period; an example such model is anomography.

§ 2.0 RECURSIVE IMPROVEMENT FROM LARGE FLOW SUB-MODELS

The recursive improvement proposal is the following: suppose we have a base model that is largest flow accurate (under conditions true of initial/full estimation problem). Such a model can accurately predict the largest flow(s) of the network with high accuracy (for example 5% or better). After applying this model and finding an estimate, we take the large flow results only from this model while treating all the remaining flows as unsolved. We then pursue a re-estimation step where the large flow(s) are frozen, and a smaller problem is solved. The forces working in favor of this approach are:

1) At each step of recursion, we can change model weights, as well as refit any internal degrees of model freedom based on features of the more restrict sub-problem.

2) The fundamental underdetermination weakens as more degrees of freedom are frozen.

The forces working against this approach are:

1) There is an accumulation of error in subproblems as not frozen flow is predicted with perfect accuracy.

2) It will be more computational expensive to solve each problem in the recursion than just an initial problem.

In light of this balance of forces then, a recursive improvement approach needs an exit condition so it does not proceed beyond point of diminishing returns.

To describe our process and findings with regard to applying recursive improvement to the QSP-MLE initial result, we begin as follows:

Recall the presumed "power-law" relation between mean and variance: $mean[x]=phi*(vari[x])^c$ The MLE algorithm seeks the vector of mean flow estimates that maximizes the likelihood function.

The exponent c is typically taken to range over 1.0 to 2.0; phi is an overall scale (solved implicitly within MLE solver).

Solve the standard QSP-MLE for different values of c and use solution with greatest likelihood. Alternatively, use several largest values of c and use likelihood weighted average.

To see how this plays out given known data, consider FIG. 5 which is a graph of alternative mean-variance fittings to largest flows. In order fit the two largest flows, different curves 40, 42 (corresponding to c) value would need to be used; because the level of misfit between large flows in particular is high. The initial way we dealt with this was by taking multiple c values. With recursive estimation, we found by running MLE and then projecting an initial estimate rescaled by a factor greater than one (i.e., 1.5) leads to a highly accurate estimate of the largest flow in particular; essentially the largest flow is fit and MLE is trapped in local minima around that flow estimate. While this can leave the remaining flows with poorer accuracy, upon recursion we repeat the process and in so doing estimate the second largest flow with high accuracy, and so on.

As large outlying flows are dealt with, we found this process described starts to work less effectively. The signal we use to exit is based on a flow domination metric, which will be described in section § 3.

Summarizing, the above was a concrete way in which recursion improvement was applied the QSP-MLE (we expected to hold for MLE based approaches in general). Essentially it allowed us to use not a single c value, but multiple c values as the recursion proceeded.

§ 3.0 ENSEMBLE MODELS

We define an ensemble model as any estimation system that uses two or more models that independently could give some estimation of the problem, in our case an estimate of the unknown flows of the TME problem.

Internal ensemble: we saw in § 3 that each value of c can be treated as its own model. While we would pick maximum likelihood c, which value of c this picks out may change in general through recursion as described at end of § 3 for the QSP-MLE model.

Noting that recursive QSP-MLE does particularly well with large-flow dominating, we can use ensemble idea to switch on this model in those cases and go to a different model outside those cases. FIG. 6 is a graph illustrating the concept of flow dominance.

As the previously disclosed tomocentrality model was found to do particularly well in low flow dominant network, a simple ensemble system we are using currently uses tomocentrality in that case.

Figure 7:
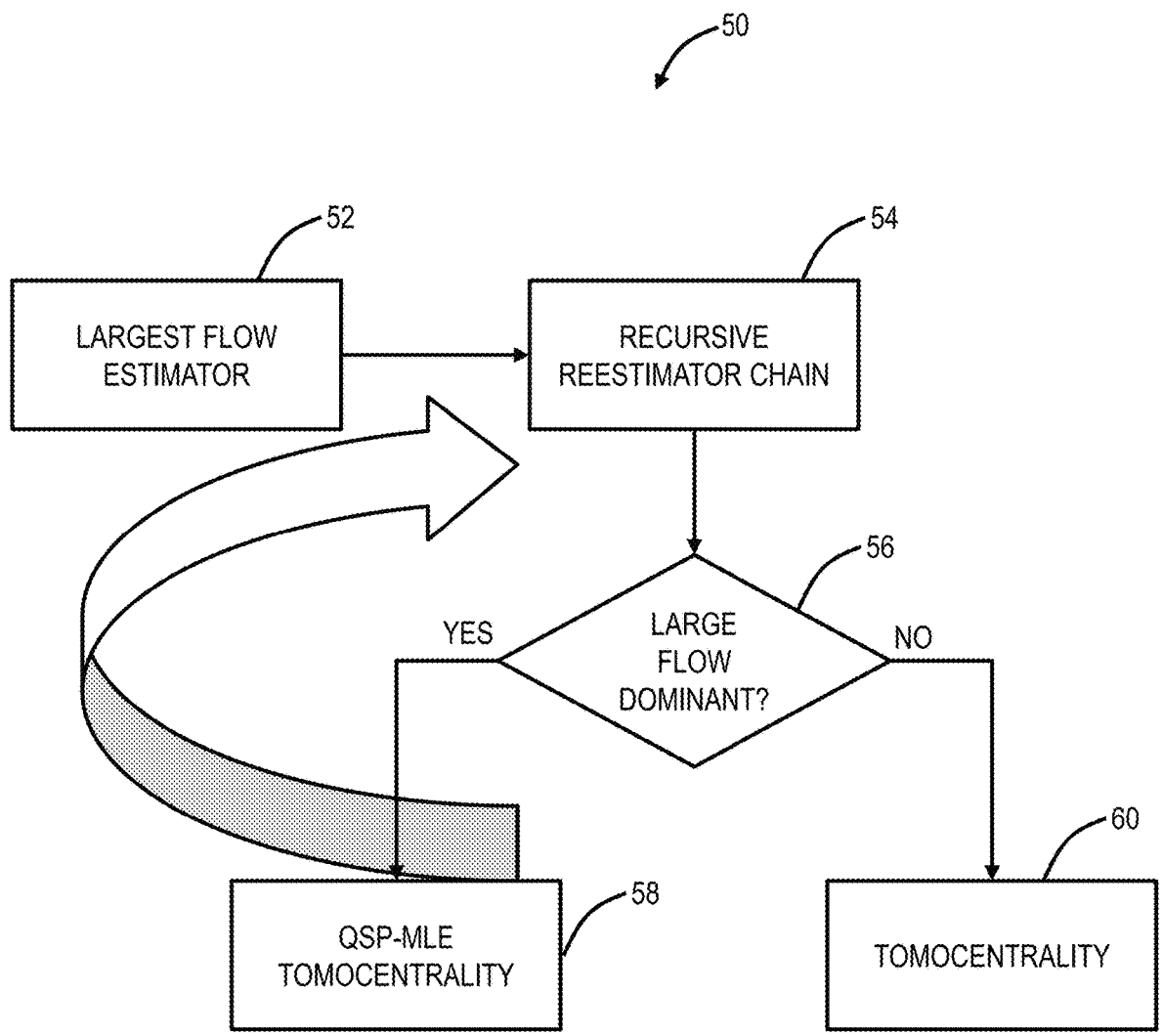
FIG. 7 is a block diagram of a process for an ensemble model with recursion.

FIG. 7 is a block diagram of a process 50 for an ensemble model with recursion. The process 50 includes estimating the largest flows (step 52) and there is a recursive reestimation (step 54) where large flows are frozen when the network is large flow dominant (step 56) and the remaining flows are reestimated with QSP-MLE tomocentrality (step 58). If the network is not large flow dominant (step 56), the estimation can just be with tomocentrality (step 60).

Of note, each dot in FIG. 5 represents a flow. Large flows are further on the x-axis. Of note, each recursive reestimation includes freezing the curves 40, 42 for the large flows and reestimating based on the remaining large flows. This process is repeated until an exit condition is reached, such as large flows<10.

Again, the overcoming of past shortcomings plays out in three stages. First, the specific three failings of the statistical (MLE) approach described in § 1. were mitigated by the design of QSP; the QSP design and how it addresses these issues specifically are also described in § 1.

The second stage of improvement came by noticing that, fortuitously, the largest flows across tested networks tended to be better than average estimated compared to the smallest, and in fact the error in small, minor flows strongly skewed overall performance (despite being isolated outliers associated to often negligibly small flows). This leads us to the concept of recursive improvement described in § 2.

The third and final stage of improvement comes from an ensemble model concept described in § 3, whereby large-flow dominated networks (and importantly their recursions) are estimated by QSP-MLE, and networks that are not large-flow dominant use the previously disclosed tomocentrality model which is particularly strong in that case.

Taken together, the results reported in § 4 represent a new level of traffic matrix estimation performance not previously reported.

§ 4.0 PERFORMANCE OF A REFERENCE INTEGRATED SYSTEM ON DOMINANT FLOWS

First, we note that our performance metric in general is the minimization of total relative error (TREL). The average TREL is average over individual TREL, which is:

$$\frac{|x_{est} - x_{actual}|}{|x_{actual}|}$$

Second, we want to set the more specific objective of having a dominant amount of traffic estimated accurately. On large-flow dominated networks, this means estimating the top flows with particularly high accuracy, while on more uniformly flow-distributed network this means estimating a larger number of the highest flows with high accuracy.

Based on experience with traffic engineering and optimization applications of traffic matrix, we decided to evaluate TREL on however many of the flows (from largest to smallest) accounts for 85% of the network traffic. With this amount of the traffic accurately estimated we believe would be a useful contribution.

To date we have tested the performance of the models described above on four networks with known flow history. Two of the data sets (A, B) are public available and two (C, D) are based on private data exfiltrated from a network management system.

Summary characteristics and performance appear in the table below.

| Data Set | Data Set summary | TREL (@85%) | # Flows (@85%) |
|---|---|---|---|
| A | 12 × 12 (6 months available, 5 min) | 9% | 63 |
| B | ~10 × 10 (1 wk, 15 min) | 5% | 3 |
| C | ~10 × 22 (1 wk, 5 min) | 12% | 21 |
| D | ~10 × 10 (1 wk, 5 min) | 5% | 3 |

Based on low flow-dominance (FD) ratio, the A data set results reflect the tomocentrality model. The other three networks start off with high flow dominance (>10) and in the table were computed using the QSP-MLE model above, with recursion proceeding until flow dominance<10, i.e., less than 10 large flows that are dominant. Of course, other values are contemplated for the exit condition. In the open literature (review papers that look across multiple studies), the very best estimation strategies typically would peak at 15% accuracy, and only then for specific networks.

What we have found is that by combining:
1) Tomocentrality for low FD flows (FD<10)
2) QSP-MLE for large FD problems applying recursive improvement until FD<10, We can achieve an accuracy 5-12% on the top N flows accounting for 85% of the total traffic. These results define a new level of performance compared to what has appeared before.

We can report that recent versions of tomocentrality in development are also giving good performance on large FD flows, and so are pursuing blended models wherein we expect a network like C to give results better at 10% and better.

Conversely, QSP-MLE could likely be improved in low FD case by optimizing code (with current implementation it would be a long process to recurse on 63 flows needed for 85% of low-FD A data set). Additionally, QSP-MLE as a statistical model benefits from having larger batches (data over longer periods); combined with optimized implementation we may be able to go further into moderate and low FD regime.

In summary: we expect to develop and cover in present work a situation where in fact we have two entirely independent models (QSP-MLE and Tomocentrality) that perform well over a significant range of flow distribution profiles (i.e., as characterized by FD parameter). Having good performance from entirely independent models is particularly fortunate for increasing performance on known data sets (i.e., giving weighted blend or other way of combining results) while adding confidence that the system will be robust under new datasets that will be seen in production.

§ 5.0 BROADER INTEGRATION WITH OTHER METHODOLOGIES AND DEPLOYMENT CONTEXTS

The above results are described in an assumed context of pure estimation: where no other sources of estimation are available in the system. In this section we will describe briefly how the methods work well in two situations where other information or other methods are available.

Partial observations refers to using NetFlow or tunnel measurements to directly monitor some but not all of network flows of interest. Partiality may be due to some resource constraints on how extensively monitoring is deployed or may arise in multi-vendor or multi-operator deployments where some nodes are capable of direct observation while others are not. A strong estimation system performance can be directly applied to partial observation.

Route change method are where before/after link measurements yield additional constraints that reduce the underdetermination problem directly. Large flow accurate estimators are highly beneficial for these methods, as they allow many fewer before/after measurement to proportionally drive down traffic weighted error.

§ 6.0 TOMOCENTRALITY

Tomocentrality significantly improves the performance of traffic matrix estimator. The proposed approach incorporates network graph statistics into the traffic matrix estimation, i.e., network topology. Advantageously, this approach was shown to significantly fast and accurate, delivering the traffic matrix in under a few seconds. Another major advantage of this approach traffic matrix inference scales to handle networks larger than any previously attempted using alternative methods. Since the initial estimation is computed with realistic assumption (fair usage of link bandwidth), it is expected that initial point is very close to the real flow counts. By doing so, the search space for finding the optimal solution is reduced significantly. This allows all recursive methods converge to the optimal solution very fast. Furthermore, this router-to-router traffic matrix may be used to directly derive an even more accurate Point of Presence (PoP) to PoP traffic matrix, and easily extending to incorporate more detailed measurements where available.

If direct measurements are not available, link count measurements (aggregate of multiple flows) and routing table information are usually available. If direct measurements are available, due to the heterogenous nature of IP networks it is likely that not all OD flows are measured. As is shown herein, finding the entire traffic matrix in either case can be done by combining partial direct measurements and utilizing the available link counts and routing information.

As described herein, the traffic matrix includes bandwidth between origin and destination. Bandwidth is an amount of traffic on a given link over a given time and can be expressed as megabits/second, gigabits/second, etc. For a given link, routers are able to keep logs of link count measurements, e.g., the amount of data seen on that link over some period of time. The present disclosure contemplates various definitions for bandwidth and any such definition can be used to describe the entries in the traffic matrix. For example, RFC 3917, "Requirements for IP Flow Information Export (IP-FIX)," October 2004, the contents of which are incorporated by reference, describes building a statistical model of a flow that includes its duration, volume, time, and burstiness. As such, related to bandwidth, this could describe estimating the volume of an IP flow in the period of time in-between the measurements. For example, assume there is a desire to for an estimate of the volume of a single/aggregated traffic flow between a pair of A-Z in a network, over a 15-minute interval (how many bytes of flow(s) observed in 15 minutes). Given this estimate, it is possible to estimate the aggregate IP flow rate in the 15-minute interval taking the volume and dividing it by time.

§ 6.1 Traffic Matrix Estimation from Link Measurements and Routing Information In an IP network, the routes can be obtained by noting that most intradomain routing protocols (e.g., Open Shortest Path First (OSPF) and Intermediate System-Intermediate System (IS-IS)) are based on a shortest path algorithm such as Dijkstra's or Bellman-Ford algorithms. Routing information can be obtained by listening to routing protocol messages (various planning tools and Network Management Systems (NMS) can do this). Link volumes in an IP network are typically available from Simple Network Management Protocol (SNMP) data or by directly querying routers. The OD traffic demands are the unknown that need to be estimate from the demands. That is, the available information includes topology (connectivity between routers), routes (computed using specific protocols), and traffic volume on each link. What is unknown is the OD traffic volume/matric. The traffic volume on each link is a raw number and does not show the OD.

The instantaneous traffic matrix can be related to link measurements and the routing matrix with $$y \approx Rx \qquad (1)$$

where y is the vector of measured link loads over links in the network, R is the routing matrix, and x is OD traffic matrix with one row corresponding to the demand of each OD pair. A flow in the matrix is denoted with $x_i \in x$. The routing matrix is structured in a way that the link measurements y correspond to the sum of OD flows that traverse the link. Due to packet latencies and the random nature of OD pair traffic, the equation is approximate.

If partial direct measurements are available, they are subtracted from the link measurements and their OD traffic matrix entry is no longer an unknown in (1). If multipath routing is used, the flow is assumed equally split along the multiple paths and it exists as multiple entries in (1).

It should be obvious that the instantaneous traffic matrix can be estimated with $$x \approx R^{-1} y \qquad (2)$$

where $R^{-1}$ is the "inverse" of the routing matrix. Alas, the routing matrix undetermined and is typically not invertible, so this solution is not possible.

To get around the undetermined matrix problem, iterative methods are used to estimate the traffic matrix.

§ 6.2 Iterative Traffic Matrix Estimation

This disclosure describes a new approach for traffic matrix estimation from link count measurements and routing information. The approach uses the network topology to arrive at a better traffic matrix estimate than what was possible previously. The topology of a network captures the information network planners had about expected network traffic, so this is extra information used to find a better estimate of the traffic matrix.

Figures 8, 9:
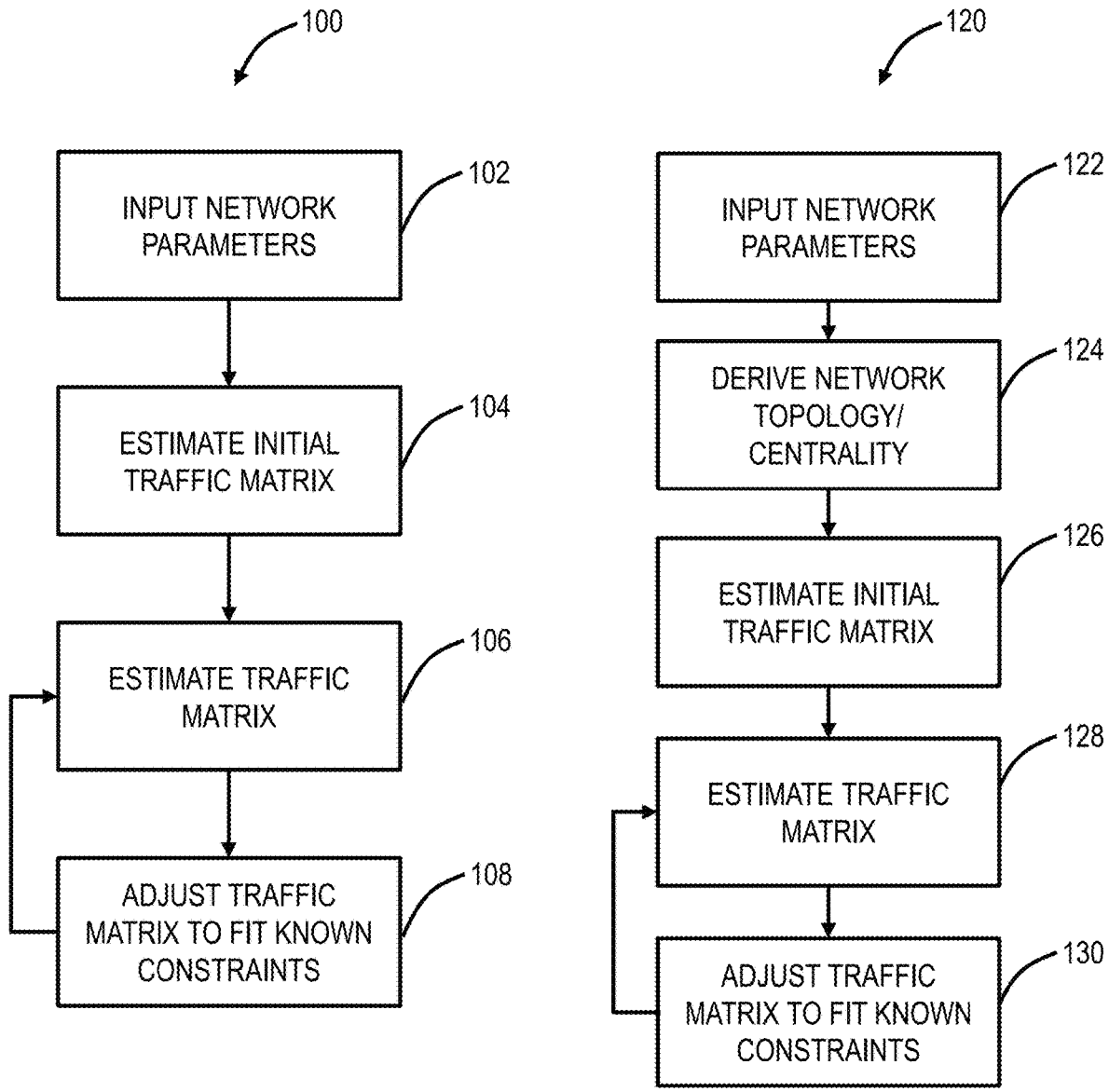
FIG. 8 is a flowchart of a general process for an iterative estimation of a traffic matrix, based on the conventional approach.
FIG. 9 is a flowchart of a process that uses topology for an iterative estimation of a traffic matrix, namely tomocentrality.

FIG. 8 is a flowchart of a general process 100 for an iterative estimation of a traffic matrix, based on the conventional approach. The process 100 is iterative, receiving input network parameters (step 102), taking an initial traffic matrix estimate (step 104), and then using an estimation procedure (step 106) followed by an adjustment procedure (step 108).

As the process 100 goes on, it produces a sequence of the traffic matrix estimates $x_0, \ldots, x_n$, each of which is expected to be closer to the true traffic matrix x in (1). The initial traffic matrix estimates and the estimate in the iterative step may produce a traffic matrix which may not match information known about the traffic (e.g., ingress/egress aggregate counts), which is fixed by using an adjustment procedure that projects the estimate into the known constraints. The success of iterative procedures is highly dependent on the initial traffic matrix estimate.

FIG. 9 is a flowchart of a process 120 that uses topology for an iterative estimation of a traffic matrix, namely tomocentrality. FIG. 9 illustrates how the present disclosure differs from known approaches. Steps 122, 126, 128, 130 of the process 120 are similar to steps 102, 104, 106, 108 of the process 100, respectively. The process 120 includes a step of deriving the network topology/centrality (step 124) before the initial traffic matrix estimation (step 126). The process 120 uses a novel and effective initialization procedure for the estimation process that produces the initial traffic matrix $x_0$. The initial traffic matrix estimation uses the knowledge of the network topology (inferred from the routing matrix) to roughly partition link counters according to what the topology implies about end-to-end traffic. The rest of the procedure can remain, so a plethora of existing methods can benefit from this approach.

The accuracy of process 120 was compared with that of other approaches the performance reduces the estimation error by 20%-30%.

§ 6.3 Initial Traffic Matrix Estimate

A significant aspect in this is disclosure is in how the initial traffic matrix is determined. The initial matrix is determined with the use of edge betweenness centrality (EBC). Assume that from the knowledge of the routing matrix, there is a set of vertices V and the set of edges E for a topology graph. It is also possible to derive the set of shortest paths. Edge betweenness centrality (EBC) for an edge $e \in E$ is defined as:

$$EBC(e) = \sum_{v_i \in V} \sum_{v_j \in V} \frac{\gamma_{v_i, v_j}(e)}{\gamma_{v_i, v_j}} \quad (3)$$

where $v_i \in V$ is a node, $\gamma_{v_i, v_j}$ is the number of shortest paths between nodes $v_i$ and $v_j$, and $\gamma_{v_i, v_j}(e)$ is the number of paths between $v_i$ and $v_j$ that pass through e.

It should be noted that value of $\gamma_{v_i, v_j}(e)$ can be integral in case that just on shortest path is used among sources and destinations, while in the general case where there are multiple shortest paths with equal cost multiple paths (ECMP) are used, it can be fractal. This value can be obtained directly from routing matrix by adding up all elements of rows corresponding to edges. As it will be explained in (6) where it is shown how routing matrix is constructed for ECMP scenarios, it would be obvious how ECMP is considered in computing $\gamma_{v_i, v_j}(e)$.

Figure 10:
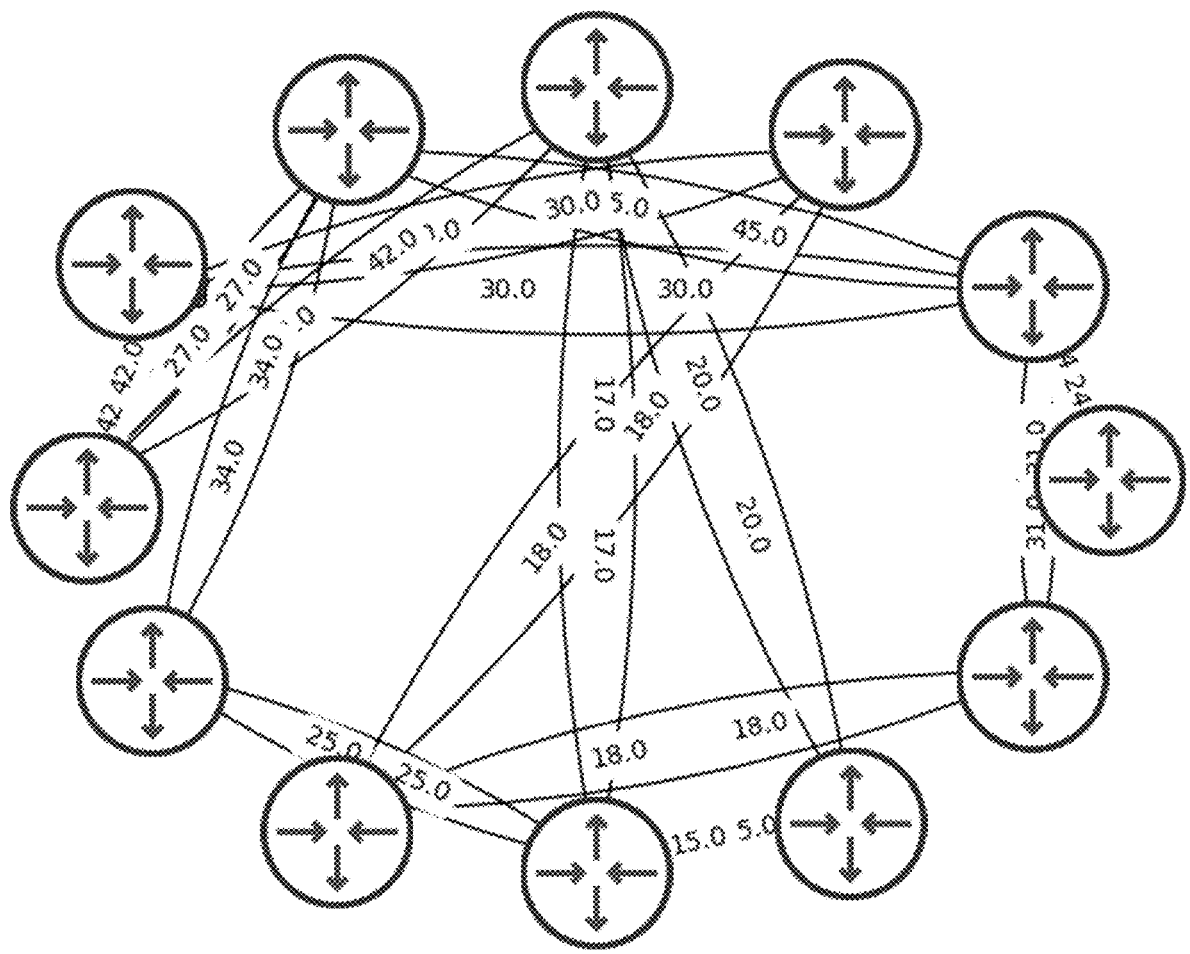
FIG. 10 is a network diagram of calculated EBC for edges of an example network topology.
Figure 11:
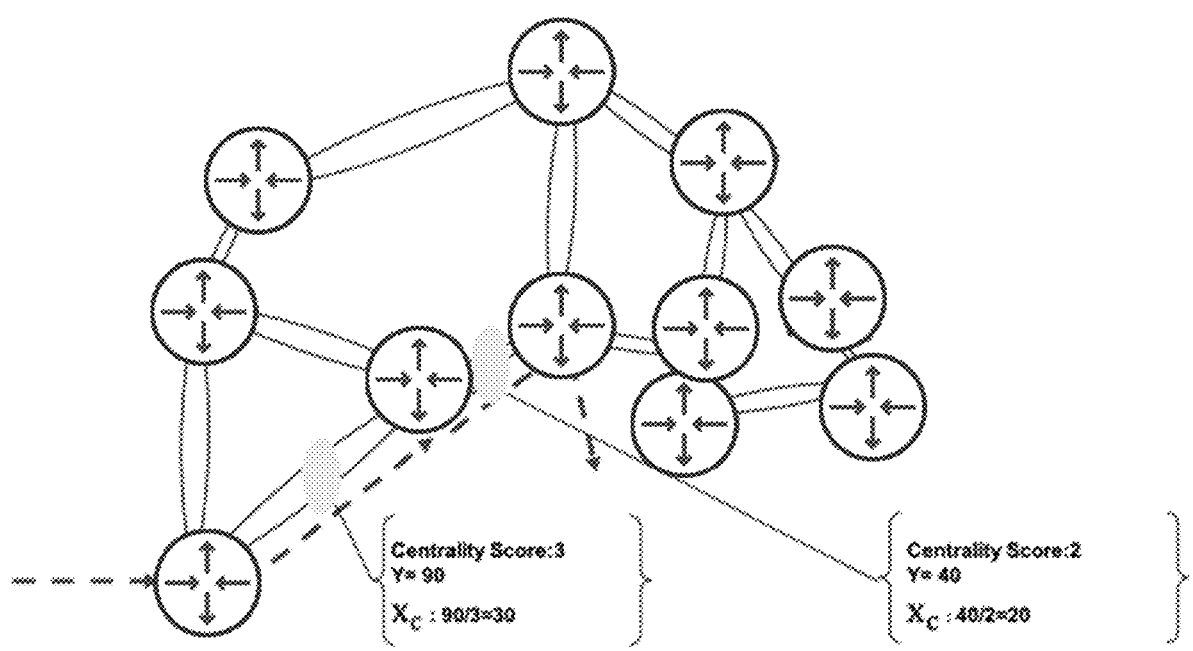
FIG. 11 is a network diagram of an example estimate based on the example network topology of FIG. 10.

FIG. 10 is a network diagram of calculated EBC for edges of an example network topology. FIG. 11 is a network diagram of an example estimate based on the example network topology of FIG. 10. Note that during network planning, the traffic is assumed to flow along shortest paths in the network, so the EBC is closely related to how much traffic network planners intended to traverse a link from various OD pairs.

To use the EBC to estimate the initial traffic matrix $x_0$, there should be a notion of fairness among flows using a link. This is like the scenario where all flows are the combination of Transmission Control Protocol (TCP) flows with any other flows which are TCP friendly. This assumption allows to estimate the fair share of aggregated traffic of a link used by all flows sharing the same link in their shortest path. It should be mention source of flows are not TCP friendly, it is the responsibility of network to enforce users to fairly utilize network bandwidth. This can be done by any variance of fair queuing. So, the OD flows can be estimated with:

$$\hat{x}_i = \underset{e \in P_i}{\operatorname{argmin}} \frac{y_e}{EBC(e)} \quad (4)$$

where $P_i$ is the path taken by the OD flow i, $y_e$ is the known link count on edge e, and this is estimating the flow as its minimum fair share among the links on its path. The initial estimate is given by concatenating the OD flows $x_0 = \{\hat{x}_1, \ldots, \hat{x}_n\}$.

The traffic estimate in (4) can be used directly as a traffic matrix estimate, or inside of an iterative estimation procedure (steps 24, 26 in FIG. 2). It should be obvious how (4) can be implemented as a software algorithm.

§ 6.4 Iteratively Refining the Traffic Matrix

While the estimate using EBC captures what is known about the network topology, it may not fit with other information known about the traffic. There is no guarantee that the estimate obtained with (4) will satisfy (1). It is therefore recommended to use an iterative procedure to produce a traffic estimate that satisfies (1).

Without any loss of generality, focus on the case that each origin-destination pair (i,j) has only a single route between them, in which case R is a binary matrix as follows (where e denotes the index of edge):

$$R_{e,(i,j)} = \begin{cases} 1, & \text{if } e \text{ is used in a path between node } i \text{ and } j \\ 0, & \text{otherwise} \end{cases} \quad (5)$$

To support the option of multipath routing, which is known as Equal-Cost Multi-Path (ECMP) routing, when there are multiple paths with the same cost, $R_{e,(i,j)}$ in (4) is non-binary matrix, with the entry in the row corresponding to link e and the column corresponding to pair (i,j):

$$R_{e,(i,j)} = \begin{cases} 1/|p|, & \text{if } e \text{ is used in one of } ECMP \text{ path between node } i \text{ and } j \\ 0, & \text{otherwise} \end{cases} \quad (6)$$

Assuming a network of n nodes and r links, the traffic matrix of the network is a square matrix of dimension n×n, with diagonal elements equal to zero. The number of origin-destination (OD) pairs, denoted by c, is obtained as c=n× (n−1). By using this notation, the dimensions of y, R, and x are defined as r×1, r×c and c×1. Since there are fewer links r is than the number of OD pairs c in general networks, and R is not invertible (1) becomes and undetermined system.

One way to solve the undetermined equation is to find the matrix $\hat{x}$, which minimizes the $L_2$ norm distance to the left side of (1):

$$\hat{x} = \underset{x}{\operatorname{argmin}} \|Rx - y\| \quad (7)$$

which is one of the previous known approaches, but it ignores the knowledge of how the network is built and operates.

Instead, this approach is iterative and uses an iterative step $$\hat{x}_{i+1} = \underset{x \in \|Rx-y\| < \varepsilon}{\operatorname{argmin}} \|Rx - \hat{x}_i\| \qquad (8)$$

where a quadratic programming problem is solved which pulls the estimate of the traffic matrix towards the previous estimate, while at the same time forcing to satisfy the constraint (1). An alternative way to satisfy (1) is to use a linear constraint:

$$\hat{x}_{i+1} = \underset{x \in Rx=y}{\operatorname{argmin}} \|Rx - \hat{x}_i\| \qquad (9)$$

To further increase the robustness against collinearity of ordinary least squares regression, we also used regularization techniques e.g., Ridge regression (which is also referred to as L2 regularization, see, e.g., Ridge Regression, available online at ncss-wpengine.netdna-ssl.com/wp-content/themes/ncss/pdf/Procedures/NCSS/Ridge_Regression.pdf, the contents of which are incorporated by reference) and lasso regression, instead solving $$\hat{x}_{i+1} = \underset{x \in Rx=y}{\operatorname{argmin}} \|Rx - \hat{x}_i\| + \lambda \|\hat{x}_i\| \qquad (10)$$

Note that the set of constraints used here is an example. Any number of other constraints can be derived and applied in equations such as (8), (9), (10), such as egress/ingress estimates, or information known from direct measurements. It is possible to implement (8), (9), (10) as a software algorithm.

§ 6.5 Process

Figure 12:
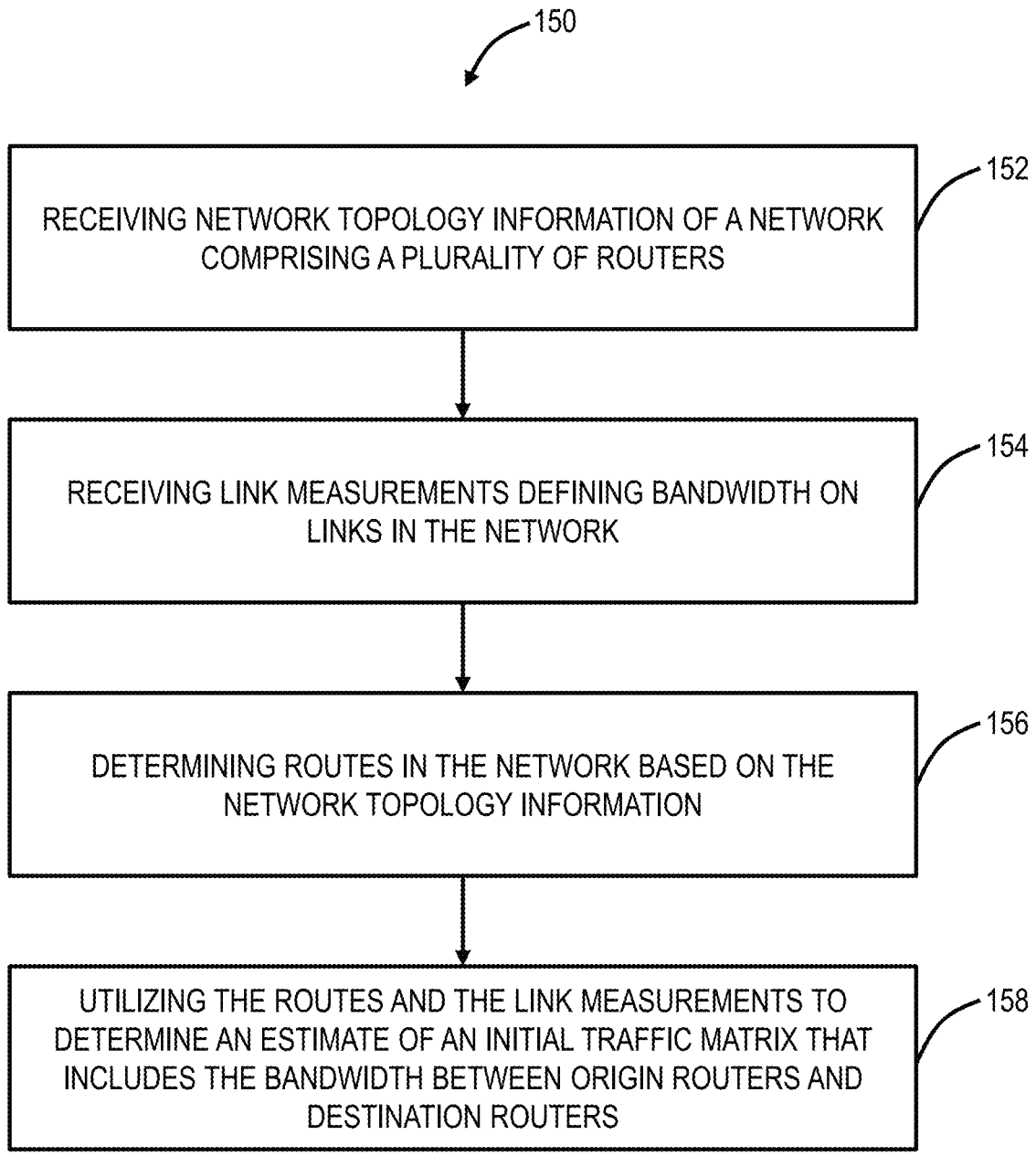
FIG. 12 is a flowchart of an iterative process to estimate a traffic matrix from link counters and routing information.

FIG. 12 is a flowchart of an iterative process 150 to estimate a traffic matrix from link counters and routing information. The process 150 contemplates implementation as a method, via circuitry or a processing device, and via instructions embodied in a computer-readable medium. The process 150 can be implemented by a network element, Network Management System (NMS), as off-box software, or the like.

The process 150 uses statistical information about the network topology graph to create an initial solution to the estimation problem. It then iteratively uses linear or quadratic programming to obtain more refined solutions of the traffic matrix that fit the known constraints from other network information.

The process 150 includes receiving network topology information of a network comprising a plurality of routers (step 152); receiving link measurements defining bandwidth on links in the network (step 154); determining routes in the network based on the network topology information (step 156); and utilizing the routes and the link measurements to determine an estimate of an initial traffic matrix that includes the bandwidth between origin routers and destination routers (step 158).

The determining routes can include determining edge betweenness centrality between the plurality of routers that are edges in a network graph. The determining routes assumes traffic flows on a shortest path between the plurality of routers. The process 150 estimates a network traffic matrix using information from the network topology such as graph features and statistics of the network topology where the network topology information is determined from collected routing information, the network topology is used to extract topology graph information, and the topology graph information is used to determine an estimate of the traffic matrix.

The process 150 can further include determining the routes from listening to routing protocol messages. The process 150 can further include receiving partial direct measurements for the bandwidth and subtracting the partial direct measurements from the link measurements before determining the estimate. The process 150 can further include repeating the receiving steps, the determining step, and the utilizing step at different points in time; and averaging results to determine a traffic matrix over the point in time and the different points in time.

The process 150 can further include iteratively adjusting the initial traffic matrix to refine the estimate using other network information. The other network information can include any of link capacity, network topology, queuing discipline, and link aggregation. The iteratively adjusting can utilize an iterative statistical estimation procedure. A refinement of the method where the estimate is used in an iterative statistical estimation procedure such as maximum likelihood estimation of the traffic matrix using the expectation maximization algorithm.

Integrating topology features is adding an extra information that is always needed in under constrained problems. Additional information can also be integrated through constraints on the model parameters or some functions of them e.g., QoS parameters for different flows. Such constraints are important to avoid unconstrained values for the initial point estimator which results in more accurate final estimation.

§ 6.6 Performance

The performance of the process 150 was compared against real traffic traces from a backbone network. The source of data is the IP-level traffic flow measurements collected form every point of presence (PoP) in a live network having 11 PoPs resulting in 121 origin-destination flows as show in FIG. 13.

The data is sampled flow data from every router over a period of six months. For validation, the RMSRE (Root Mean Square Relative Error) is used to provide an overall relative metric for the errors in the estimates.

$$RMSRE = \sqrt{\sum_{i=1}^{n} \Delta x_{rel,i}^2 \cdot 1/n} \qquad (6)$$

$$\Delta x_{rel,i}^2 = \frac{x_i}{t_i} - 1$$

where $t_i$ is the desired value and $x_i$ is the actual value.

The results for the three approaches are presented in the table below. The table shows the original traffic matrix, the estimated value for each OD pair and the relative error. The average error was 30% for the gravity method, 27% for the tomogravity method, and 17% for our approach which using the Ridge regularization.

| Method | RMSRE |
| --- | --- |
| Simple Gravity(SG) | 29.6 |
| Tomogravity | 27 |

| Method | RMSRE |
|---|---|
| The process 150 | 23 |
| The process 150 + L2 regularization | 17 |

§ 7.0 PROCESS

Figure 13:
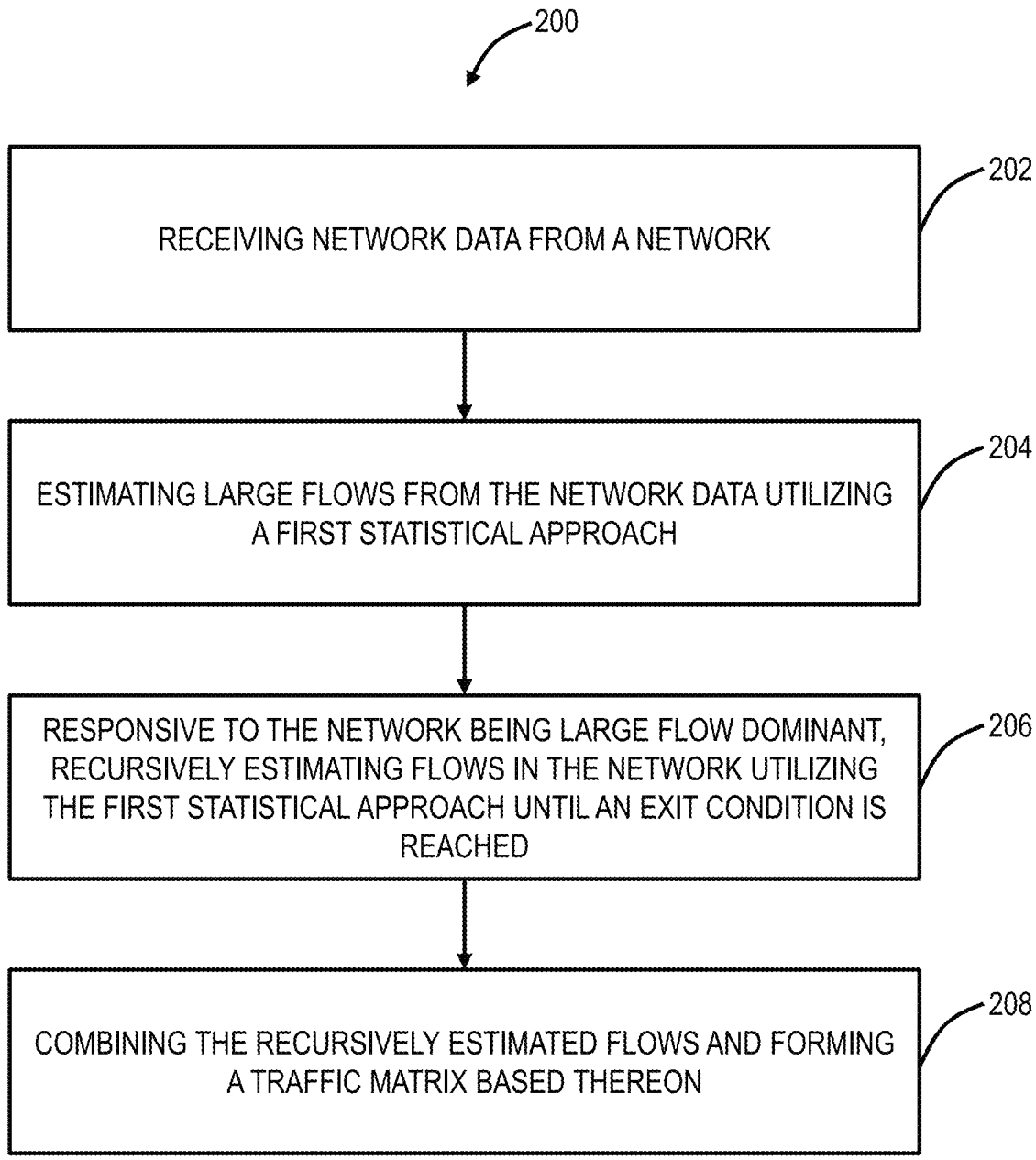
FIG. 13 is a flowchart of a process for estimating a traffic matrix of a communication network, such as using the quasi-stationary peaking maximum-likelihood estimation (QSP-MLE) model and recursive improvement.

FIG. 13 is a flowchart of a process 200 for estimating a traffic matrix of a communication network, such as using the quasi-stationary peaking maximum-likelihood estimation (QSP-MLE) model and recursive improvement. The process 200 contemplates implementation as a method, via circuitry or a processing device, and via instructions embodied in a computer-readable medium. The process 200 can be implemented by a network element, Network Management System (NMS), as off-box software, or the like.

The process 200 includes receiving network data from a network (step 202); estimating large flows from the network data utilizing a first statistical approach (step 204); responsive to the network being large flow dominant, recursively estimating flows in the network utilizing the first statistical approach until an exit condition is reached (step 206); and combining the recursively estimated flows and forming a traffic matrix based thereon (step 208).

The process 200 can further include, responsive to the network not being large flow dominant, estimating the flows utilizing a second statistical approach and forming the traffic matrix based thereon. The first statistical approach can include quasi-stationary peaking maximum-likelihood estimation and the second statistical approach can include tomocentrality.

The process 200 can further include utilizing the traffic matrix for traffic engineering in the network. The recursively estimating flows can include estimating a set of large flows utilizing the first statistical approach and freezing a resulting estimate while leaving smaller flows unsolved; repeating the estimating for a next set of large flows from the unsolved smaller flows; and continuing the repeating until the exit condition is reached. The exit condition can be a number of large flows below a threshold. The combining can include a weighted average.

§ 8.0 CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium comprising instructions that, when executed, cause a processing device to perform steps of:
    receiving network data from a network;
    estimating flows from the network data utilizing a first statistical approach;
    determining whether the network is large flow dominant or not;
    responsive to determining that the network being large flow dominant based on a flow dominance metric indicative of a relative contribution of large flows versus small flows exceeding a predefined threshold, recursively estimating flows that are large flows in the network utilizing the first statistical approach until an exit condition is reached, the exit condition comprising the flow dominance metric decreasing below the predefined threshold is reached, thereby indicating that the remaining flows are no longer large-flow dominant; and
    combining the recursively estimated flows and forming a traffic matrix based thereon.

2. The non-transitory computer-readable medium of claim 1, wherein the steps further include
    responsive to the network not being large flow dominant, estimating flows for both the large flows and remaining flows utilizing a second statistical approach and forming the traffic matrix based thereon.

3. The non-transitory computer-readable medium of claim 2, wherein the first statistical approach includes quasi-stationary peaking maximum-likelihood estimation and the second statistical approach is tomocentrality.

4. The non-transitory computer-readable medium of claim 1, wherein the steps further include
utilizing the traffic matrix for traffic engineering in the network.

5. The non-transitory computer-readable medium of claim 1, wherein the first statistical approach includes quasi-stationary peaking maximum-likelihood estimation.

6. The non-transitory computer-readable medium of claim 1, wherein the recursively estimating flows includes
estimating a set of large flows utilizing the first statistical approach and freezing a resulting estimate while leaving smaller flows unsolved;
repeating the estimating for a next set of large flows from the unsolved smaller flows; and
continuing the repeating until the exit condition is reached.

7. The non-transitory computer-readable medium of claim 1, wherein the combining includes a weighted average.

8. A method comprising steps of:
receiving network data from a network;
estimating flows from the network data utilizing a first statistical approach;
determining whether the network is large flow dominant or not;
responsive to determining that the network being large flow dominant based on a flow dominance metric indicative of a relative contribution of large flows versus small flows exceeding a predefined threshold, recursively estimating flows that are large flows in the network utilizing the first statistical approach until an exit condition is reached, the exit condition comprising the flow dominance metric decreasing below the predefined threshold is reached, thereby indicating that the remaining flows are no longer large-flow dominant; and
combining the recursively estimated flows and forming a traffic matrix based thereon.

9. The method of claim 8, wherein the steps further include
responsive to the network not being large flow dominant, estimating flows for both the large flows and remaining flows utilizing a second statistical approach and forming the traffic matrix based thereon.

10. The non-transitory computer-readable medium of claim 2, wherein the first statistical approach includes quasi-stationary peaking maximum-likelihood estimation and the second statistical approach is tomocentrality.

11. The method of claim 8, wherein the steps further include utilizing the traffic matrix for traffic engineering in the network.

12. The method of claim 8, wherein the first statistical approach includes quasi-stationary peaking maximum-likelihood estimation.

13. The method of claim 8, wherein the recursively estimating flows includes
estimating a set of large flows utilizing the first statistical approach and freezing a resulting estimate while leaving smaller flows unsolved;
repeating the estimating for a next set of large flows from the unsolved smaller flows; and
continuing the repeating until the exit condition is reached.

14. The method of claim 8, wherein the combining includes a weighted average.

15. An apparatus comprising one or more processors and memory storing instructions that, when executed, cause the one or more processors to:
receive network data from a network,
estimate flows from the network data utilizing a first statistical approach,
determine whether the network is large flow dominant or not,
responsive to a determination that the network being large flow dominant based on a flow dominance metric indicative of a relative contribution of large flows versus small flows exceeding a predefined threshold, recursively estimate flows that are large flows in the network utilizing the first statistical approach until an exit condition is reached, the exit condition comprising the flow dominance metric decreasing below the predefined threshold is reached, thereby indicating that the remaining flows are no longer large-flow dominant, and
combine the recursively estimated flows and forming a traffic matrix based thereon.

16. The apparatus of claim 15, wherein the memory storing instructions that, when executed, cause the one or more processors to
responsive to the network not being large flow dominant, estimate flows for both the large flows and remaining flows utilizing a second statistical approach and forming the traffic matrix based thereon.

17. The apparatus of claim 16, wherein the first statistical approach includes quasi-stationary peaking maximum-likelihood estimation and the second statistical approach is tomocentrality.

18. The apparatus of claim 15, wherein the memory storing instructions that, when executed, cause the one or more processors to recursively estimate flows by
estimating a set of large flows utilizing the first statistical approach and freezing a resulting estimate while leaving smaller flows unsolved,
repeating the estimating for a next set of large flows from the unsolved smaller flows, and
continuing the repeating until the exit condition is reached.

* * * * *